United States Patent [19]

Ueda et al.

[11] Patent Number: 5,064,592

[45] Date of Patent: Nov. 12, 1991

[54] PROCESS OF PRODUCING SURFACE HARDENED WOODY DECORATIVE SHEETS

[75] Inventors: Minoru Ueda; Hideaki Matsuda; Koichi Murakami, all of Kagawa, Japan

[73] Assignee: Okura Kogyo Kabushiki Kaisha, Japan

[21] Appl. No.: 442,577

[22] Filed: Nov. 29, 1989

[30] Foreign Application Priority Data

Nov. 29, 1988 [JP] Japan ............... 63-299513

[51] Int. Cl.$^5$ ............... C08G 63/48; C08H 5/04; C08J 5/06
[52] U.S. Cl. ................. 264/112; 264/109; 524/13; 524/14; 525/54.3; 527/103
[58] Field of Search ............ 264/134, 112, 119, 109; 524/13, 14; 525/54.3; 527/103

[56] References Cited

U.S. PATENT DOCUMENTS

| | | | |
|---|---|---|---|
| 3,645,939 | 2/1972 | Gaylord | 525/54.23 |
| 4,175,105 | 1/1979 | Luck et al. | 264/112 |
| 4,237,087 | 12/1980 | Jones | 264/134 |
| 4,517,228 | 5/1985 | Matejka et al. | 427/370 |

FOREIGN PATENT DOCUMENTS

| | | | |
|---|---|---|---|
| 59-9041 | 1/1984 | Japan | |
| 59-152837 | 8/1984 | Japan | |
| 60-9737 | 1/1985 | Japan | 264/112 |
| 60-124203 | 7/1985 | Japan | |
| 60-166301 | 8/1985 | Japan | |

*Primary Examiner*—Mary Lynn Theisen
*Attorney, Agent, or Firm*—Rosenman & Colin

[57] ABSTRACT

The invention relates to a process of producing a surface hardened woody decorative sheet by reacting a cellulose material such as a wood flour, a wood chip, a chaff, etc., with a dibasic acid anhydride and a monoepoxy compound having a polymerizable double bond to form a setting composition mainly composed of an oligoesterified cellulose material having a polymerizable double bond and an oligomer having a polymerizable double bond, placing in layer the setting composition on a woody sheet, and hot-pressing them to integrate the setting composition and the woody sheet in a body.

14 Claims, No Drawings

PROCESS OF PRODUCING SURFACE HARDENED WOODY DECORATIVE SHEETS

FIELD OF THE INVENTION

This invention relates to a process of industrially advantageously producing surface hardened woody decorative sheet having a beautiful appearance and being excellent in the surface hardness, abrasion resistance, and water resistance.

BACKGROUND OF THE INVENTION

Woods such as a zelkova, a Japanese oak, etc., have been widely used for floor materials, etc., owing to visual and feeling characteristics such as the beauty of the grain of wood and mild feeling of wood, etc. Also, woods such as a Honduras rose wood, a Yellow Birch, etc., have largely used as the sound plate, which is a sound generating portion of a marimba, a xylophone, etc., owing to the hardness of the surface thereof and the good sound tone. However, since such precious trees become gradually few, increase the scarecity value thereof, and become expensive, the development of a process of increasing the quality of low grade woods having inferior appearance and soft surface have recently been desired.

Hitherto, for improving the beautiful appearance, surface hardness, abrasion resistance and water resistance, etc., of wood, a process of applying a so-called wood plastic combination (WPC) treatment, that is, a treatment of impregnating wood with a thermosetting resin at reduced pressure or under pressure and curing the resin by heating under pressure is known. However, in the WPC treatment, the process is complicated, the equipment becomes large, and the product cost becomes high. Also, in the WPC treatment, a resin film is not formed on the surface of the treated wood and hence the surface hardness of the product is low.

Also, there is a process of overlaying a paper impregnated with a thermosetting resin on the surface of a wood. However, in the process, the resin impregnated in a nonwoven fabric, a paper or a cloth is inferior in fluidity, which results in causing such difficulties that a floating phenomenon occurs on the surface of a wood having large vessel or tracheid as a fault of the coated surface and also the adhesion becomes inferior.

Furthermore, there is a process of directly coating the surface of wood with a thermosetting resin. In this case, the process is suitable for coating the highly uneven surface of a vessel, etc. However, the process has a disadvantage that the viscosity of the resin reduces suddenly during hot-press molding and the resin oozes out from the side surface of the wood to outside. Also, the process has a further disadvantage that the product formed is poor in cracking resistance and the resin layer formed in the surface is liable to be cracked.

SUMMARY OF THE INVENTION

The object of this invention is, therefore, to provide a process of industrially advantageously producing a surface hardened woody decorative sheet having an excellent beautiful appearance and being excellent in the surface hardness, abrasion resistance, and water resistance by applying a setting composition mainly composed of an oligoesterified cellulose material having a polymerizable double bond (Component A) and an oligomer having a polymerizable double bond (Component B) on to the surface of a woody sheet being poor in appearance and having a soft surface and hot-pressing the sheet.

As the result of various investigations under the circumstances as described above, the inventors have discovered that by forming a layer of a setting composition mainly composed of an oligoesterified cellulose material having a polymerizable double bond (Component A) and an oligomer having a polymerizable double bond (Component B) on a woody sheet and pressing the sheet under heating, a coating layer excellent in surface hardness, abrasion resistance, and water resistance can be formed on the woody sheet and at the same time physically and chemically very strongly adheres to the wood sheet to integrate the setting composition in a body, whereby a surface hardened woody decorative sheet without having the aforesaid disadvantages is obtained and have succeeded in accomplishing the present invention.

That is, according to this invention, there is provided a process of industrially advantageously producing a surface hardened woody decorative sheet by preparing a setting composition mainly composed of an oligoesterifed cellulose material having a polymerizable double bond (Component A) and an oligomer having a polymerizable double bond (Component B) by reacting a cellulose material with a dibasic acid anhydride and a monoepoxy compound having a polymerzable double bond, placing the aforesaid setting composition on a woody sheet in layer with the existence or absence of a polymerization initiator, and plasticizing the setting composition at a temperature and pressure necessary for plasticizing Component A while, at the same time, performing crosslinking aforesaid Component A and Component B based on the double bonds of them to integrate the setting composition and the woody sheet in a body.

DETAILED DESCRIPTION OF THE INVENTION

Then, the process of this invention is explained in detail.

According to the process of this invention, the oligoesterified cellulose material (Component A) in the aforesaid setting composition is easily plasticized to form a transparent coating layer on the surface of a woody sheet and also the patterns such as the wood grain of the woody material appears very clearly to give a beautiful appearance by this coating layer. Also, the surface of the product is precise to give mild feeling, which is not obtained in general plastics. Furthermore, in the process of this invention, the disadvantage in the aforesaid conventional process that the resin oozes from the side surface of the wood to outside does not occur.

The setting composition for use in this invention is produced from the following raw materials.

As the cellulose material, there are small wood pieces such as wood flours, wood fibers, wood chips, by-produced as industrial wastes in the industries using woods, chaffs which are wasted in large quantities without being utilized, waste papers, pulps, rice straws, wheat straws, linters, bagasses, etc. Also, sander powders wasted during the production of particle boards, fiber boards, etc., can be used. There is no particular restriction on the form of these cellulose materials but it is preferred use the cellulose material in a form of as small as possible.

Also, there is no particular restriction on the dibasic acid anhydride for use in this invention and there are maleic anhydride, phthalic anhydride, succinic anhydride, tetrahydrophthalic anhydride, hexahydrophthalic anhydride, itaconic anhydride, 3,6-dichlorophthalic anhydride, etc., but maleic anhydride, phthalic anhydride and succinic anhydride which are industrially advantageous and inexpensive are preferably used in this invention.

Furthermore, there is no particular restriction on the monoepoxy compound having a polymerizable double bond for use in this invention and there are allyl glycidyl ether, glycidyl methacrylate, glycidyl acrylate, vinylcyclohexene monoepoxide, etc., but allyl glycidyl ether and glycidyl methacrylate are preferably used for the industrial practice.

The setting composition for use in this invention is obtained by simultaneously adding the dibasic acid anhydride and the monoepoxy compound having a polymerizable double bond to the cellulose material followed by causing the reaction or after adding the dibasic acid anhydride to the cellulose material followed by causing the reaction, adding thereto the monoepoxy compound followed by causing the reaction. The setting composition thus obtained is mainly composed of an oligoesterified cellulose material having a polymerizable double bond (Component A) and an oligomer having a polymerizable double bond (Component B).

The oligoesterified cellulose material (Component A) is formed by alternately adding the dibasic acid anhydride and the monoepoxy compound having a polymerizable double bond to the hydroxy groups in the cellulose material component. In this case, the total amount of the dibasic acid anhydride and the monoepoxy compound having a polymerizable double bond is from 30 to 800 parts by weight, and preferably from 30 to 150 parts by weight to 100 parts by weight of the cellulose material and since in this invention, it is preferred to the oligoesterified cellulose material (Component A) having a cellulose content of from 60 to 90% by weight, it is preferred to select the amount of the aforesaid two components in the range of satisfying the above-described content. Also, the monoepoxy compound having a polymerizable double bond is preferably used in an amount of from 1 to 2 mols per mol of the dibasic acid anhydride being used.

The main reaction is an alternate addition esterification reaction but as the case may be, an etherification of the epoxy group of the monoepoxy compound may partially occur. Also, for accelerating the aforesaid reaction, an ordinary addition esterification catalyst may be used.

The condition for proceeding the alternate addition esterification reaction depends upon the kinds of the dibasic acid anhydride and the monoepoxy compound, having a polymerizable double bond being used the reaction, but, in general, the reaction easily proceeds at temperature of at least 60° C. to reduce the residual acid value and the epoxy value.

In the formation of the aforesaid oligoesterified cellulose material (Compound A), the oligomer to which the dibasic acid anhydride and the monoepoxy compound having a polymerizable double bond are alternately added (Component B) is formed at the same time. When the total amount of the dibasic acid anhydride and the monoepoxy compound having a polymerizable double bond being used is in the range of from 30 to 150 parts by weight to 100 parts by weight of the cellulose material, about from 30 to 80% by weight of the dibasic acid anhydride and the monoepoxy compound having a polymerizable double bond used for the reaction are formed a free oligomer (Component B) simultaneously with the formation of the oligoesterified cellulose material (Component A). Also, as the case may be, after the aforesaid alternate addition esterification reaction, the dibasic acid anhydride and the monoepoxy compound having a polymerizable double bond remain in the setting composition as unreacted components although the amounts of them are small.

In this invention, the oligoesterified cellulose material (Component A) is plasticized by the existence of the oligomer (Component B) at hot-press molding and at the same time the polymerizable double bonds in the oligoesterified cellulose material (Component A) and the oligomer (Component B) are polymerized with crosslinkage to form a transparent and strong coating layer on the surface of the woody sheet. In this case, according to the kind of the polymerizable double bonds, the setting can be further accelerated by the addition of a small amount of a polymerization initiator. In general, when an unsaturated double bond is a methacryl group, the polymerization proceeds by a heat polymerization only without particularly need the existence of a polymerization initiator but when the double bond is an allyl group, the existence of a polymerization initiator is required. As the polymerization initiator, free radical initiators such as dicumyl peroxide, benzoyl peroxide, azobisisobutyronitrile, cumene hydroperoxide, etc., are suitable. In these initiators, dicumyl peroxide is preferred for industrial practice.

Furthermore, in this invention, it is preferred for further accelerating the plasticization of the oligoesterified cellulose material (Component A) at hot-press molding to add a thermosetting resin such as an unsaturated polyester resin, a diallyl phthalate resin, etc., or a thermoplastic resin such as polyethylene oxide, a methyl methacrylate-butadiene-styrene copolymer, etc., to the aforesaid setting composition. Also, a flame retarder, a reinforcing agent such as glass fibers, and carbon fibers, a coloring agent such as various dyes and pigments and an inorganic filler can be added to the setting composition.

As the woody material for use in this invention, a wood having a soft surface or a wood having indistinct wood grain pattern, such as a cryptomeria, a Japanese cypress, Basswood, Magnolia hypoleuca, a Japenese Judas tree, etc. are generally used. As other materials, woody base materials such as plywoods, particle boards, fiber boards, laminated woods, laminated veneer lumbers, etc., vegetable fiber series base materials molded using bagasses, chaffs, etc., can be also used. Also, woods or aforesaid base materials impregnated with a monomer, a prepolymer, or polymer followed by curing can be used.

The form or the woody sheet for use in this invention may have a flat plane, a curved plane or various uneven patterns. Also, materials in a state of producing the aforesaid woody base materials or vegetable fiber series based materials, such as a fiber mat obtained by forming wood fibers spray coated with an adhesive can be used.

Then, the production process of this invention is explained in detail.

First, it is preferred that the cellulose material for use in this invention is dried to a moisture content of less than 5% by a vacuum dryer or a hot blast dryer.

Then, the dibasic acid anhydride and the monoepoxy compound having a polymerizable double bond are added to the cellulose material and the mixture is stirred by heating to a reaction temperature of at least 60° C. with or without adding a catalyst to the system. The reaction gradually proceed during stirring by heating to the aforesaid temperature. When the reaction temperature is lower than 60° C., the addition ratios of the dibasic acid anhydride and the monoepoxy compound having a polymerizable double bond to the cellulose material are very low or the additions thereof do not occur, and hence the employment of such a low reaction temperature is undesirable.

The reaction time is usually from 30 minutes to 10 hours, and preferably from one hour to 7 hours. The esterification degree of the alternate addition esterification reaction can be adjusted by controlling the reaction temperature and the reaction time and the reaction is continued until the oligoesterified cellulose material (Component A) having a desired esterification degree is obtained.

The setting composition thus obtained is mainly composed of the oligoesterified cellulose material having a polymerizable double bond (Component A) and the oligomer having a polymerizable double bond (Component B). The mixing ratio is preferably from 10 to 45 parts by weight of the oligomer (Component B) to 100 parts by weight of the oligoesterified cellulose material (Component A). Also, as the case may be, the unreacted dibasic acid anhydride and monoepoxy compound having a polymerizable double bond exist in the setting composition obtained.

As described above, if necessary, a polymerization initiator is sufficiently mixed with the setting composition thus prepared. There is no particular restriction on the mixing method but a kneading means such as a blender, a kneader, a mixing roll, a Banbury mixer, etc., can be used for mixing them.

Then, the setting composition obtained as described above is placed on the woody sheet in layer. In general, the setting composition is spread over the surface of the woody sheet. The spreading amount of the setting composition differs according to the quality and the thickness of the woody sheet and the appearance of the surface hardened woody decorative sheet being produced. For example, it is preferred that in the case of producing a surface hardened woody decorative sheet having a smooth surface, the spreading amount of the setting composition is from 0.2 kg/m$^2$ to 1.0 kg/m$^2$ and in the case of forming an uneven pattern on the surface of the decorative sheet, the spreading amount of the setting composition is at least 1.0 kg/m$^2$.

Also, for improving the balance of the surface hardened woody decorative sheet by the shrinking stress by curing of the setting composition after hot-pressing, the setting composition for use in this invention or a wood flour spray-coated with a liquid of a thermosetting resin is applied to the back surface hardened woody decorative sheet followed by hot-pressing to laminate the setting composition or the wood flour in a body, whereby the occurence of bending of the surface hardened woody decorative sheet can be prevented.

Then, a smooth mirro-plane plate or an emboss plate having an uneven pattern is applied to the layer of the setting composition spread on the surface of the woody sheet and the plate is pressed under heating for a desired time. The hot-pressing condition is suitably selected according to the kind of the surface hardened woody dercorative sheet.

That is, the proper temperature is in the range of from 100° C. to 200° C. The pressure may be one necessary for plasticizing the oligoesterified cellulose material (Component A) and is generally from 10 to 600 kg/cm$^2$, and preferably from 20 to 400 kg/cm$^2$. The pressing time may be from 1 to 40 minutes.

In the such hot-pressing condition, the oligoesterified cellulose material (Component A) is plasticized and at the same time the double bond in the oligoesterified cellulose material (Component A) and the double bond in the oligomer (Component B) existing in the setting composition cause crosslinking by polymerization to form a strong chemical bond between the oligoesterified cellulose material (Component A) and the oligomer (Component B), whereby a strong network structure as the whole system. Furthermore, when in the surface hardened woody decorative sheet obtained by the process of this invention, the dibasic acid anhydride and the monoepoxy compound having a polymerizable double bond exist in the setting composition as unreacted components, the hydroxy groups in the surface portion of the woody material cause an open chain esterification reaction with the acid anyhydride group in the unreacted dibasic acid anhydride, whereby the epoxy group in the unreacted monoepoxy compound causes an addition esterification reaction with the carboxy group at the side chain thus formed and the surface of the woody sheet is crosslinked with the oligoesterified cellulose material (Component A) through the dibasic acid anhydride and the monoepoxy compound having a polymerizable double bond to integrate then in a body with a chemically very strong bonding force.

As described above, the invention provides a process of industrially profitablly a surface hardened woody decorative sheet by placing in layer the setting composition as described above on a woody sheet and hot-press molding them.

As the hot-press molding, the oligoesterified cellulose material (Component A) is plasticized and at the same time the double bonds in the oligoesterified cellulose compound (Component A) and the oligomer (Component B) cause crosslinking by polymerizing to strongly bind each other, whereby a three dimensional structure integrated in a body is formed. Accordingly, the surface hardened woody decorative sheet of this invention has a transparent tough coating layer on the surface of the woody sheet, clearly shows the pattern of the woody sheet, and has a precise and very excellent appearance. Also, the decorative sheet of this invention is very excellent in the surface hardness, abrasion resistance, and water resistance.

Also, as described above, since in the surface hardened woody decorative sheet of this invention, the oligoesterified cellulose materials (Component A) each other and the oligoesterified cellulose material (Component A) and the woody sheet are integrated in a body by a chemical very strong binding force, the decorative sheet is completely safe in a 1st class dip peeling test for boling resistance. Accordingly, in the production of the surface hardened woody decorative sheet of this invention, it is unnecessary to apply an adhesive onto the surface of the woody sheet.

Also, in the surface hardened woody decorative sheet obtained by the production process of this invention, a large amount of cellulose material can be used as the raw material for the coating layer of the surface layer portion of the decorative sheet and hence the decorative sheet obtained is inexpensive, light, and excellent in workability.

Accordingly, the surface hardened woody decorative sheet obtained by the process of this invention is suitable utilized in various fields as, for example, building materials such as floor materials, wall materials, etc.; materials for music instruments such as a marinba, a xylophone, etc.; and decorative materials of general furniture. Furthermore, the invention has such advantage that low grade woods having an inferior appearance and soft surface can be utilized and woody materials and unutilized cellulose materials, which have been considered to be industrial wastes in wood industries, can be effectively utilized, and hence the process of this invention is industrially very useful.

Then, the invention is explained more practically by the following examples and comparison examples, wherein a dry wood, flour and dry chaff are those dried to a moisture content of 5% or lower. In addition, the invention is not, as a matter of course, limited to the examples.

EXAMPLE 1

In a four liter three neck separable flask were placed 120.0 g of a dry wood flour of a Japanese red pine passed through a 24 mesh sieve and 26.4 g of maleic anhydride and they were reacted with stirring for one hour at 120° C. Thereafter, 53.6 g of glycidyl methacrylate was added and the mixture was reacted with stirring for 7 hours at 110° C.

A part of the product was sampled and analyzed. The result showed that the product was composed of an oligoesterified wood having a polymerizable double bond and a viscous liquid and the total addition rate of maleic anhydride and glycidyl methacrylate added to the wood in the oligoesterified wood having polymerizable double bond was 30.8% by weight based on the amount of the wood. Also, the ratio of the oligoesterified wood having polymerizable double bond, and the viscous liquid was 78.5 : 21.5 by weight ratio. The viscous liquid was mostly composed of an oligomer having polymerizable double bond and contained unreacted maleic anhydride and glycidyl methacrylate although the amounts of them were small.

After the reaction was over, the product thus obtained was used as the setting composition for use in this invention without being washed. Then, the setting composition was uniformly spread on a mirror-plane plate at a spreading amount of 0.4 kg/m², a veneer of a Japanese cypress having 10 cm (fiber direction)×10 cm (radial direction)×0.5 cm (tangential direction) was placed on the spread layer of the composition, the setting composition was further uniformly spread on the veneer at a spreading amount of 0.4 kg/m², and mirror-plane plate was further placed on the spread layer of the composition, and then the assembly was inserted between hot plates of a press machine and hot-press molded. The hot-press molding was performed for 30 minutes at temperature of 180° C. and a pressure of 70 kg/cm².

The surface hardened woody decorative sheet of this invention obtained after hot-press molding had the tough and precise hardened surface and also plastic-like excellently beautiful appearance having luster.

EXAMPLE 2

In a four liter three neck separable flask were placed 120.0 g of a dry flour of a Japanese red pine passed through a 24 mesh sieve and 31.8 g of maleic anhydride and they were reacted with stirring for one hour at 120° C. Thereafter, 48.1 g of allyl glycidyl ether was added to the reaction mixture and they were reacted with stirring for 7 hours at 120° C.

A part of the product obtained was sampled and analyzed. The result showed that the product was composed of an oligoesterified wood having a polymerizable double bond and a viscous liquid and the total addition rate of maleic anhydride and allyl glycidyl ether added to the wood in the oligoesterified wood having polymerizable double bond was 33.5% by weight based on the weight of the wood. Also, the ratio of the oligoesterified wood having polymerizable double bond and the viscous liquid was 80.1:19.9 by weight ratio. The viscous liquid was mostly composed of an oligomer having a polymerizable double bond and contained unreacted maleic anhydride and allyl glycidyl ether although the amounts of them were small.

After the reaction, the product thus obtained was used as the setting composition for use in this invention without being washed.

Then, 2 parts by weight of dicumyl peroxide was added to 100 parts by weight of the setting composition thus obtained and they were sufficiently mixed by means of a mixing roll. Thereafter, the mixture was spread on a wood sheet and hot-press molded in the same manner as in Example 1.

The surface hardened woody decorative sheet of this invention obtained after hot-press molding had the tough and precise hardened surface and showed a plastic-like excellently beautiful appearance having luster.

EXAMPLE 3

In a four liter three neck flask were placed 120.0 g of a dry wood flour of a Japanese red pine passed through a 24 mesh sieve and 35.6 g of phthalic anhydride and they were reacted with stirring for one hour at 150° C. Thereafter, 44.4 g of glycidyl methacrylate was added thereto and they were further reacted with stirring for 7 hours at 90° C.

A part of the product was sampled and analyzed. The result showed that the product was composed of an oligoesterified wood having a polymerizable double bond and a viscous liquid and the total addition ratio of phthalic anhydride and glycidyl methacrylate added to the wood in the oligoesterified wood having polymerizable double bond was 23.5% by weight based on the weight of the wood.

Also, the ratio of the oligoesterified wood having polymerizable double bond and the viscous liquid was 74.1:25.9 by weight ratio.

The viscous liquid was mostly composed of the oligomer having polymerizable double bond and contained unreacted phthalic anhydride and glycidyl methacrylate although the amounts of them were small.

The product thus obtained was used as the setting composition for use in this invention without being washed.

Then, the setting composition was spread on a woody sheet and hot-press molded in the same manner as in Example 1. The surface hardened woody decorative sheet thus obtained after hot-press molding had the tough and precise surface and showed a plastic-like excellently beautiful appearance having luster.

COMPARISON EXAMPLE 1

A venner of a Japanese cypress having 10 cm (fiber direction)×10 cm (radial direction)×0.5 cm (tangential direction) was inserted between hot plates of a press machine and hot-pressed for 30 minutes at 180° C. and 70 kg/cm² to provide a woody sheet.

The results of physical property tests on the surface hardened woody decorative sheets obtained in Examples 1 to 3 and the woody sheet obtained in Comparison Example 1 are shown in Table 1 below. The physical property tests were carried out according to the methods of JAS and JIS shown below.

Scratch Hardness Test Test A: JAS Special Plywood
Scratch Hardness Test Test B: JAS Special Plywood
1st Dip Peeling Test: JAS Special Plywood
Abrasion Resisting Test: JIS A1453 (total ration no. 1000)

In addition, in the water resisting test, 5 ml of distilled water was placed on each of the surface hardened woody decorative sheets and the woody sheet and after covering the sample with a watch glass, the water absorption of the sample to 5 ml of the distilled water after 6 hours was measured. In this case, however, when all the distilled water on the surface was absorbed, the test was stopped and the water absorption of the sample was defined to be 100%.

TABLE 1

|   | Scratch Test Test A ($\mu$m) | Hardness Test B ($\mu$m) | (A) | (B) (mg) | (C) (%) |
|---|---|---|---|---|---|
| Example 1 | passed (5.8) | passed (1.1) | passed | 2 | 3 |
| Example 2 | passed (7.3) | passed (1.1) | passed | 1 | 3 |
| Example 3 | passed (8.2) | passed (1.7) | passed | 7 | 3 |
| Comparison Example 1 | n.g. (—) | n.g. (10.3) | — | 48 | 100 |

(A): 1st class Dip peeling Test
(B): Abrased Amount in the Abrasion Resisting Test
(C): Water Absorption in the Water Resisting Test As is clear from the results shown in Table 1, the surface hardened woody decorative sheets of this invention obtained in Example 1 to 3 showed remarkably improved properties in the scratch hardness test, the abrasion resisting test, and the water resisting test as compared with the woody sheet in Comparison Example 1. Also, in the 1st class dip peeling test for the boling resistance, the samples of this invention were very stable and thus in the production of the surface hardened woody decorative sheet, it is clearly unnecessary to apply an adhesive onto the surface of the woody sheet.

EXAMPLE 4

By following the same procedure as in Example 2 except that a dry chaff was used in place of the dry wood flour of a Japanese red pine, the reaction was performed.

A part of the product obtained was sampled and analyzed. The result showed that the product was composed of an oligoesterified chaff having a polymerizable double bond and a viscous liquid and the total addition rate of maleic anhydride and allyl glycidyl ether added to the chaff in the oligoesterified chaff having polymerizable double bond was 25.1% by weight based on the chaff. Also, the ratio of the oligoesterified chaff having polymerizable double bond and the viscous liquid was 75.1:24.9 by weight ratio.

The viscous liquid was mostly composed of an oligomer having a polymerizable double bond and contained unreacted maleic anhydride and allyl glycidyl ether although the amounts of them were small.

The product was used as the setting composition for use in this invention without being washed. Then, 2 parts by weight of dicumyl peroxide was added to 100 parts by weight of the setting composition and they were sufficiently mixed by means of a mixing roll. Thereafter, the mixture was uniformly spread on a mirror-plane plate at a spreading amount of 0.4 kg/m², a Japanese cypress sheet of 30 cm in length, 4 cm in width and 2 cm in thickness was placed on the spread layer of the composition, the setting composition was further spread uniformly on the sheet at a spreading amount of 0.4 kg/m², a mirror-plane plate was placed thereon and the assembly was inserted in hot plates of a press machine and hot-press molded. The hot press was performed for 30 minutes at 180° C. and 50 kg/cm² in pressure.

The surface hardened woody decorative sheet of this invention thus obtained had a tough and precise hardened surface and showed a plastic-like beautiful appearance having luster. The surface hardened woody decorative sheet is suitable for the top woods of furnitures.

EXAMPLE 5

The setting composition obtained in Example 1 was uniformly spread on a mirror-plane plate at a spreading amount of 0.4 kg/m², a sheet of Magnolia hypoleuca having 30 cm in length, 4 cm in width and 2 cm in thickness was placed on the spreading layer of the composition, the setting composition was further uniformly spread on the sheet at a spreading amount of 0.4 kg/m², a mirror-plane plate was placed thereon and the assembly was inserted between hot plates of a press machine and hot-pressed for 30 minutes at 180° C. and 50 kg/cm² in pressure.

The surface hardened woody decorative sheet of this invention thus obtained had a tough and precise hardened surface and showed a plastic-like beautiful appearance having luster. The surface hardened woody decorative sheet is suitable as a sound plate for marimba.

EXAMPLE 6

In a five liter three neck separable flask were placed 210.0 g of a dry sander powder discharged during the production of particle board, 55.7 g of maleic anhydride, and 84.3 g of allyl glycidyl ether and they were reacted with stirring for 5 hours at 130° C.

A part of the product was sampled and analyzed. The result showed that the product was composed of an oligoesterified sander powder having a polymerizable double bond and a viscous liquid and the total addition rate of maleic anhydride and allyl glycidyl ether added to the oligoesterified sander powder having polymerizable double bond was 31.4% by weight based on the weight of the sander powder. Also, the ratio of the oligoesterified sander powder having polymerizable double bond and the viscous liquid was 78.9:21.1 by weight ratio. The viscous liquid was mostly composed of an oligomer having a polymerizable double bond and contained unreacted maleic anhydride and allyl glycidyl ether although the amounts of them were small.

The product thus obtained was used as the setting composition for use in this invention without being washed.

Then, 2 parts by weight of dicumyl peroxide was added to 100 parts by weight of the setting composition and they were sufficiently mixed by means of a mixing roll. Thereafter, the mixture was uniformly spread on a mirror-plane plate at a spreading amount of 0.4 kg/m², a sheet of a Japanese Judas tree having 30 cm in length, 4 cm in width, and 2 cm in thickness was placed on the spread layer of the composition, the setting composition was further uniformly spread on the sheet at a spreading amount of 0.4 kg/m², a mirror-plane plate was placed thereon and the assembly was inserted between hot plates of a press machine and hot-pressed for 30 minutes at 150° C. and 40 kg/cm² in pressure.

The surface hardened woody decorative sheet of this invention thus obtained had a tough and precise hardened surface and showed a plastic-like excellently beautiful appearance having luster. The surface hardened woody decorative sheet is suitable for top woods for furniture.

EXAMPLE 7

In a 5 liter three neck separable flask were placed 210.0 g of dry flour of a Japanese red pine passed through a 24 mesh sieve, 46.2 g of maleic anhydride and 93.8 g of glycidyl methacrylate and they were reacted with stirring for 4 hours at 90° C.

A part of the product was sampled and analyzed. The result showed that the product obtained was composed of an oligoesterified wood having a polymerizable double bond and a viscous liquid and the total addition ratio of maleic anhydride and glycidyl methacrylate added to the wood in the oligoesterified wood having polymerizable double bond was 26.2% by weight based on the weight of the wood. Also, the ratio of the oligoesterified wood having polymerizable double bond and the viscous liquid was 75.7:24.3 by weight ratio. The viscous liquid was mostly composed of an oligomer having a polymerizable double bond and contained unreacted maleic anhydride and glycidyl methacrylate although the amounts of them were small.

The product thus obtained was used as the setting composition for use in this invention without being washed. The mixture of the setting composition was uniformly spread on a mirror-plane plate as a spreading amount of 0.6 kg/m², a sheet of a Japanese Judas tree having 30 cm in length, 15 cm in width, and 1.5 cm in thickness was placed on the spread layer of the composition, the setting composition was further uniformly spread on the sheet at a spreading amount of 0.6 kg/m², a mirror-plane plate was placed thereon and the assembly was inserted between hot plates of a press machine and hot-press molded. The hot press molding was performed at 180° C. and 70 kg/cm² for 40 minutes.

The surface hardened woody decorative sheet of this invention thus obtained had a tough and precise hardened surface and showed a plastic-like excellently beautiful appearance having luster. The surface hardened woody decorative sheet is suitable of floor materials.

What is claimed is:

1. A process of producing a surface-hardened woody decorative sheet, which comprises forming on a woody sheet a layer of a mixture of (A) a composition mainly composed of an oligoesterified cellulose material having a polymerizable double bond and (B) an oligomer having a polymerizable double bond obtained by reacting a cellulose material, a monoepoxy compound having a polymerizable double bond and a dibasic acid anhydride, and then heat-pressing said woody sheet to simultaneously carry out the plasticization of component (A) and the crosslinking of components (A) and (B) by the polymerization of the polymerizable double bonds of said components (A) and (B).

2. The process as claimed in claim 1, wherein the cellulose material is wood flours, wood fibers, wood chips, chaffs, waste papers, pulps, rice straws, wheat straws, linter powders, bagasses, or sander powders.

3. The process as claimed in claim 1, wherein the dibasic acid anhydride is maleic anhydride, phthalic anhydride, or succinic anhydride.

4. The process as claimed in claim 1, wherein the monoepoxy compound is allyl glycidyl ether or glycidyl methacrylate.

5. The process as claimed in claim 1, wherein the setting composition mainly composed of the oligoesterified cellulose material having polymerizable double bond (Component A) and the oligomer having polymerizable double bond (Component B) is prepared by adding the basic acid anhydride to the cellulose material following by reaction and then adding thereto the monoepoxy compound having polymerizable double bond followed by causing reaction.

6. The process as claimed in claim 1, wherein the setting composition mainly composed of the oligoesterified cellulose material having polymerizable double bond (Component A) and the oligomer having polymerizable double bond (Component B) is prepared by simultaneously adding the dibasic acid anhydride and the monoepoxy compound having polymerizable double bond to the cellulose material followed by reaction.

7. The process as claimed in claim 1, wherein the total amount of the dibasic acid anhydride and the monoepoxy compound having polymerizable double bond is from 30 to 150 parts by weight to 100 parts by weight of the cellulose material.

8. The process as claimed in claim 1, wherein the amount of the monoepoxy compound having polymerizable double bond is from 1 to 2 mols per mol of the dibasic acid anhydride.

9. The process as claimed in claim 1, wherein the reaction of producing the setting composition from the cellulose material, the dibasic acid anhydride, and the monoepoxy compound having polymerizable double bond is carried out at a temperature of at least 60° C.

10. The process as claimed in claim 1, wherein the amount of the setting composition being spread on the surface of the woody sheet is from 0.2 to 1.0 kg/m².

11. The process as claimed in claim 1, wherein in the case of producing the surface hardened woody decorative sheet having an uneven pattern on the surface of the woody sheet, the amount of the setting composition being spread on the surface of the woody sheet is at least 1.0 kg/m².

12. The process as claimed in claim 1, wherein in the setting composition, the proportion of the oligomer having polymerizable double bond (Component B) to the oligoesterified cellulose material having polymerizable double bond (Component A) is from 10 to 45 parts by weight to 100 parts by weight of the latter.

13. The process as claimed in claim 1, wherein the plasticization of the setting composition obtained from the cellulose material, the dibasic acid anhydride, and the allyl glycidyl ether is carried out in the existence of dicumyl peroxide as a polymerization initiator.

14. The process as claimed in claim 1, wherein the heat-pressing is carried out at a temperature of from 100° to 200° C. at a pressure of from 20 to 400 kg/cm² for from 1 to 40 minutes.

* * * * *